US011906039B2

(12) United States Patent
Bormann et al.

(10) Patent No.: US 11,906,039 B2
(45) Date of Patent: Feb. 20, 2024

(54) SELECTOR DEVICE FOR A USER INPUT FOR SHIFTING A VEHICLE GEARBOX, AND GEARBOX SYSTEM FOR A VEHICLE

(71) Applicant: ZF Friedrichshafen AG, Friedrichshafen (DE)

(72) Inventors: Dirk Bormann, Bissendorf (DE); Ludger Rake, Steinfeld (DE)

( * ) Notice: Subject to any disclaimer, the term of this patent is extended or adjusted under 35 U.S.C. 154(b) by 65 days.

(21) Appl. No.: 17/432,304

(22) PCT Filed: Feb. 19, 2020

(86) PCT No.: PCT/EP2020/054275
§ 371 (c)(1),
(2) Date: Aug. 19, 2021

(87) PCT Pub. No.: WO2020/169626
PCT Pub. Date: Aug. 27, 2020

(65) Prior Publication Data
US 2022/0136597 A1 May 5, 2022

(30) Foreign Application Priority Data

Feb. 20, 2019 (DE) ...................... 10 2019 202 283.9

(51) Int. Cl.
*F16H 59/10* (2006.01)
*F16H 59/02* (2006.01)
*F16H 61/22* (2006.01)

(52) U.S. Cl.
CPC ....... *F16H 59/105* (2013.01); *F16H 59/0278* (2013.01); *F16H 61/22* (2013.01); *F16H 2059/0269* (2013.01)

(58) Field of Classification Search
CPC ....... F16H 2059/026; F16H 2059/0269; F16H 2059/047; F16H 59/105; F16H 59/0278;
(Continued)

(56) References Cited

U.S. PATENT DOCUMENTS

| 4,756,205 A | * | 7/1988 | Dickinson | ............... F16H 61/36 |
| | | | | 74/471 XY |
| 8,960,361 B2 | * | 2/2015 | Helot | ................... F16H 59/0217 |
| | | | | 180/326 |

(Continued)

FOREIGN PATENT DOCUMENTS

| DE | 10 2007 058 922 B3 | 6/2009 |
| EP | 2 567 127 B1 | 3/2014 |

(Continued)

OTHER PUBLICATIONS

International Search Report and Written Opinion of the International Search Authority dated Apr. 17, 2020 in International Application No. PCT/EP2020/054275 (English and German languages) (11 pp.).

(Continued)

*Primary Examiner* — Charles A Fox
*Assistant Examiner* — Gregory T Prather
(74) *Attorney, Agent, or Firm* — Crowell & Moring LLP

(57) ABSTRACT

A selector device for a user input for shifting a vehicle transmission may be connected to the vehicle transmission for signal transfer. The selector device may include a slider unit coupled to a selector knob for the user input, and a housing unit for receiving the slider unit. The slider unit may be moveable in relation to the housing unit in a translatory manner. The selector device may have a ball bearing unit, where the ball bearing unit is designed to guide the slider unit linearly in the housing unit.

16 Claims, 18 Drawing Sheets

(58) Field of Classification Search
CPC ...... F16H 61/22; F16C 29/004; F16C 29/005; F16C 29/04; F16C 29/046; F16C 33/3837; G05G 1/025
See application file for complete search history.

(56) References Cited

U.S. PATENT DOCUMENTS

| | | | |
|---|---|---|---|
| 9,494,228 B2 | 11/2016 | Hermansson | |
| 10,563,754 B2* | 2/2020 | Woo | F16H 59/08 |
| 2003/0029261 A1* | 2/2003 | DeJonge | F16H 63/42 |
| | | | 74/335 |
| 2006/0087316 A1* | 4/2006 | Islam | G01D 5/145 |
| | | | 324/207.25 |
| 2008/0006113 A1 | 1/2008 | Matsui et al. | |
| 2011/0200276 A1* | 8/2011 | Bolzonaro | F16C 29/04 |
| | | | 384/13 |
| 2013/0139632 A1* | 6/2013 | Rake | F16H 59/08 |
| | | | 74/473.3 |
| 2014/0338488 A1* | 11/2014 | Hermansson | F16H 61/24 |
| | | | 74/473.3 |
| 2015/0043842 A1* | 2/2015 | Stijns | A47B 88/487 |
| | | | 384/49 |
| 2016/0040778 A1* | 2/2016 | Magrini | F16H 61/36 |
| | | | 74/473.15 |
| 2017/0175880 A1* | 6/2017 | Beattie | F16H 59/08 |
| 2017/0373687 A1* | 12/2017 | Neugart | H01H 13/14 |
| 2019/0128404 A1 | 5/2019 | Morales et al. | |
| 2019/0383498 A1* | 12/2019 | Tremolieres | F16C 33/38 |
| 2020/0067619 A1* | 2/2020 | Ueda | H04B 1/00 |

FOREIGN PATENT DOCUMENTS

| | | |
|---|---|---|
| FR | 2 965 032 | 3/2012 |
| WO | 2 567 127 A1 | 11/2011 |

OTHER PUBLICATIONS

Office Action dated Oct. 11, 2019 for German Patent Application No. 10 2019 202 283.9, (12 pp.), note: pp. 1 and 2 are English language Explanations to Section C. Result of Determination Document.

* cited by examiner

SELECTOR DEVICE FOR A USER INPUT FOR SHIFTING A VEHICLE GEARBOX, AND GEARBOX SYSTEM FOR A VEHICLE

RELATED APPLICATIONS

This application is a filing under 35 U.S.C. § 371 of International Patent Application PCT/EP2020/054275, filed Feb. 19, 2020, and claiming priority to German Patent Application 10 2019 202 283.9, filed Feb. 20, 2019. All applications listed in this paragraph are hereby incorporated by reference in their entireties.

TECHNICAL FIELD

The present invention relates to a selector device for a user input for shifting a vehicle transmission and a transmission system for a vehicle.

BACKGROUND

With regard to an actuation of vehicle transmissions, an actuator for a gear shifting transmission is known from DE 10 2007 058 922 B3, for example, wherein the actuator contains a connecting shaft. A gearshift lever setting should also reflect the actual shifting state of the transmission with shift-by-wire controlled gear-shifting transmissions. EP 2 567 127 B1 discloses an actuator for selecting gear settings in a shift-by-wire gear shifting transmission with a control knob that can be moved in a translatory manner, and a latching gearwheel.

BRIEF DESCRIPTION OF THE DRAWINGS

The invention shall be explained in greater detail below in reference to the drawings. Therein.

The same or similar reference symbols are used in the following description of preferred exemplary embodiments of the present invention for the elements shown in the various figures that have identical or similar functions, wherein there shall be no repetition of the these elements.

DETAILED DESCRIPTION

Figure 1:
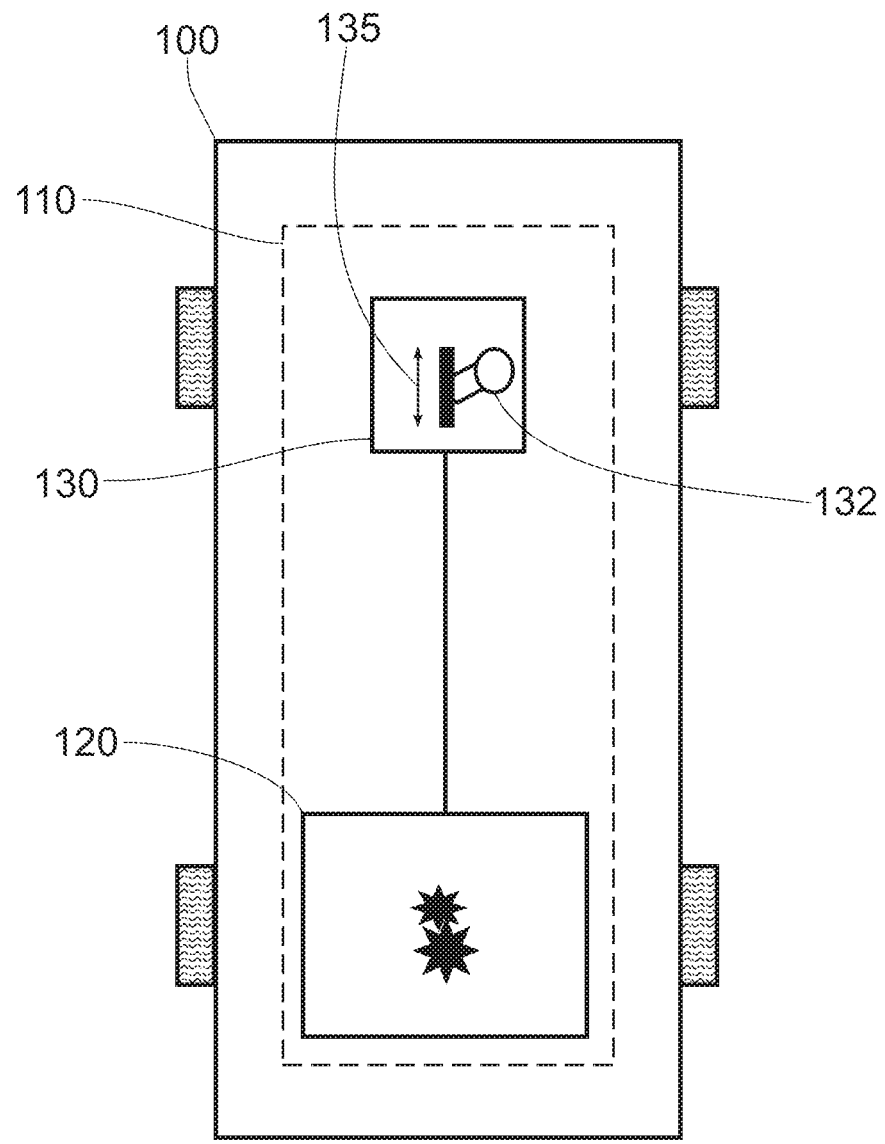
FIG. 1 shows a schematic illustration of a vehicle that has a transmission system according to an exemplary embodiment.

The present invention creates an improved selector device for a user input for shifting a vehicle transmission and an improved transmission system for a vehicle according to the independent claims. Advantageous embodiments can be derived from the dependent claims and the following description.

According to embodiments, a sliding selector, or a selector device for a sliding gearshift lever with translatory shifting actuation can be provided, wherein a ball bearing can function as the linear guide for the translatory shifting actuation, or the gearshift lever movement. A selector device that has translatory actuation along a single displacement axis can therefore be provided, e.g. for a vehicle transmission that has shift-by-wire control or shift-by-wire actuation, wherein a bearing between moving and stationary components during actuation can be obtained by means of a ball bearing device.

Advantageously, a selector device with a simple and uncomplicated structure can be obtained with various embodiments. Such a selector device can enable a precise and convenient shifting actuation for shifting a vehicle transmission. The selector device can be produced inexpensively. Furthermore, the selector device can be robust. By way of example, the selector device can absorb unintentional contact forces and prevent incorrect actuation, wherein movement along the displacement axis for the translatory actuation is unimpeded by friction, and can be precisely and reliably carried out.

A selector device for a user input for shifting a vehicle transmission is presented, wherein the selector device can be or is connected to the vehicle transmission for signal transfer, wherein the selector device has a slider unit that is coupled to a selector knob for the user input, and a housing unit that contains the slider unit, wherein the slider unit can be moved in relation to the housing unit in a translatory manner, wherein the selector device has a ball bearing unit, wherein the ball bearing unit is designed to guide the slider unit linearly in the housing unit.

The vehicle transmission can be a shift-by-wire vehicle transmission. The vehicle transmission can be built into or incorporated in a vehicle. The vehicle can be a motor vehicle, in particular a passenger automobile, truck, or some other utility vehicle. The selector device can be located or placed in the vehicle next to a driver's seat. In particular, the selector device can be, or is connected to the vehicle transmission by electrical and/or optical lines. The slider unit can be displaced in relation to the housing unit for the user inputs. The slider unit can be or is located at least partially within the housing unit. The slider unit can have a coupling element for coupling to the selector knob. By way of example, when the selector device is assembled, the coupling element can protrude at least partially out of the housing unit. Optionally, the selector device can also contain the selector knob. The housing unit can comprise numerous parts. The housing unit can be designed to mechanically delimit the linear movement of the slider unit occurring with a user input. The housing unit can contain at least one stop for this. The ball bearing unit is or can be placed in the housing unit. The ball bearing unit can contain numerous balls.

According to one embodiment, indents can be formed in the ball bearing unit for retaining the balls. The indents can be formed in holes for the balls. Such an embodiment has the advantage that the balls in the ball bearing unit can be reliably positioned and retained without additional means.

The ball bearing unit can also have a ball cage for retaining the balls. The ball cage can be designed to at least partially receive the slider unit. The slider unit can be moved in relation to the ball cage in a translatory manner with a user input. The ball cage can be designed to mechanically delimit the linear movement of the slider unit occurring with a user input. The ball cage can contain at least one stop for this. Such an embodiment offers the advantage that the ball bearing for the slider unit can be obtained in a simple, space- and weight-saving manner.

The ball cage can have an upper part and a lower part for retaining the balls. The slider unit can be or is placed between the upper part and lower part. Two straight rows of balls can be retained in the upper part. Two straight rows of balls can be retained in the lower part. Such an embodiment offers the advantage of a simple and quick assembly of the ball bearing unit and slider unit, and therefore the selector device.

Furthermore, grooves can be formed in the slider unit as rolling paths for the balls in the ball bearing unit. Such an embodiment offers the advantage of a precise linear guidance of the slider unit, without canting. In particular, four straight grooves can be formed in the slider unit.

Furthermore, the selector device can contain a latching unit that can be attached to the slider unit, and a latching connector that can be attached to the housing unit. The latching unit and the latching connector can be designed to interact when the selector device has been assembled, to tighten the slider unit in a resting position in relation to the housing unit. The latching unit and latching connector can be part of a latching mechanism. The latching connector can have a concave, U-shaped and/or V-shaped profile. Such an embodiment offers the advantage that the transmission unit, and therefore a selector knob coupled to the selector device, can be in a monostable state, such that it can slide in both directions along an axis of the linear guide, and returned to the resting position by means of the latching mechanism.

The latching unit can be held away from the slider unit and placed on the slider unit such that it can engage with the latching connector. In particular, the latching unit can have a sleeve encompassed by a helical spring, or a pin encompassed by a helical spring. Such an embodiment offers the advantage that the slider unit can be reliably and easily returned to the resting position.

The selector device can also have a sensed element that is attached to the slider unit. The sensed element can be designed to be detected by a detection device for determining a relative position of the slider unit in relation to the housing unit. The sensed element can be attached to the slider unit by means of a retaining element. Such an embodiment offers the advantage of reliably detecting a user input or shifting actuation. The direction and length of the translatory movement of the user input can be reliably and precisely detected, for example.

The sensed element can be in the shape of a rhombus. The sensed element can also be made of a material that can be detected by means of a capacitive and/or magnetic detection principle. Such an embodiment offers the advantage that it is possible to precisely and reliably determine the position of the sensed element on the slider unit.

The sensed element can be or is also placed on the slider unit such that it can be pulled away from the slider unit and toward a printed circuit board in the selector device. In particular, a retaining element with which the sensed element can be attached to the slider unit can be held in place by a helical spring. The retaining element can also have contacts that come in contact with the printed circuit board. Such an embodiment offers the advantage of being able to reliably maintain a predefined spacing between the sensed element and the printed circuit board and/or the detection device, to enable a precise determination of the position thereof.

The selector device can also have a printed circuit board that has a detection device for determining a relative position of the slider unit to the housing unit. The detection device can contain two conductor paths, for example. The printed circuit board can also contain electronic modules for preparing and processing signals. Such an embodiment offers the advantage of a simple and precise determination of the relative position of the slider unit. Furthermore, a connection for signal transfer can be readily obtained between the printed circuit board and the vehicle transmission.

The detection device can be designed to determine the relative position using a capacitive detection principle and/or a magnetic detection principle. The detection device can have two conductor paths. In particular, the detection device can be a capacitive sensor, Hall sensor, and/or a sensor for three dimensional detection. Such an embodiment offers the advantage of being able to precisely and reliably determine a position in order to correctly detect a user input.

According to one embodiment, the housing unit can have at least two housing parts. The housing parts can be attached to one another by fasteners. At least the slider unit and the ball bearing unit can be placed between the housing parts. The fasteners can be screws or rivets. Such an embodiment offers the advantage that the selector device can be quickly and easily assembled.

In particular, the housing unit can have an upper housing part, a lower housing part and a base plate. When the selector device is assembled, the slider unit and the ball bearing unit can be placed between the upper housing part and the lower housing part. The latching unit and the latching connector can also be placed between the upper housing part and the lower housing part. The sensed element and the printed circuit board can be placed between the lower housing part and the base plate.

A transmission system for a vehicle is also presented, wherein the transmission system contains an embodiment of the selector device specified above, and the vehicle transmission, wherein a connection for signal transfer is or can be obtained between the selector device and the vehicle transmission.

An embodiment of the aforementioned selector device can be advantageously implemented or used in the transmission system for receiving user inputs and converting them to a shifting signal that can be transferred to the vehicle transmission. The invention shall be explained in greater detail below in reference to the drawings. Therein:

FIG. 1 shows a schematic illustration of a vehicle 100 that has a transmission system 110 according to an exemplary embodiment. The transmission system 110 contains a vehicle transmission 120 and a selector device 130. The vehicle transmission 120 and the selector device 130 are connected to one another for signal transfer. The selector device 130 has a selector knob 132, or is coupled to the selector knob 132. The selector device 130 is designed to receive a user input for shifting the vehicle transmission 120 and convert it to a signal that can be sent to the vehicle transmission 120. The selector device 130 is configured or designed to enable a linear displacement, or translatory movement of the selector knob 132 along a displacement axis 135 or actuation axis 135 in response to a user input. The selector device 130 shall be explained in greater detail below in reference to the other figures.

Figure 2:
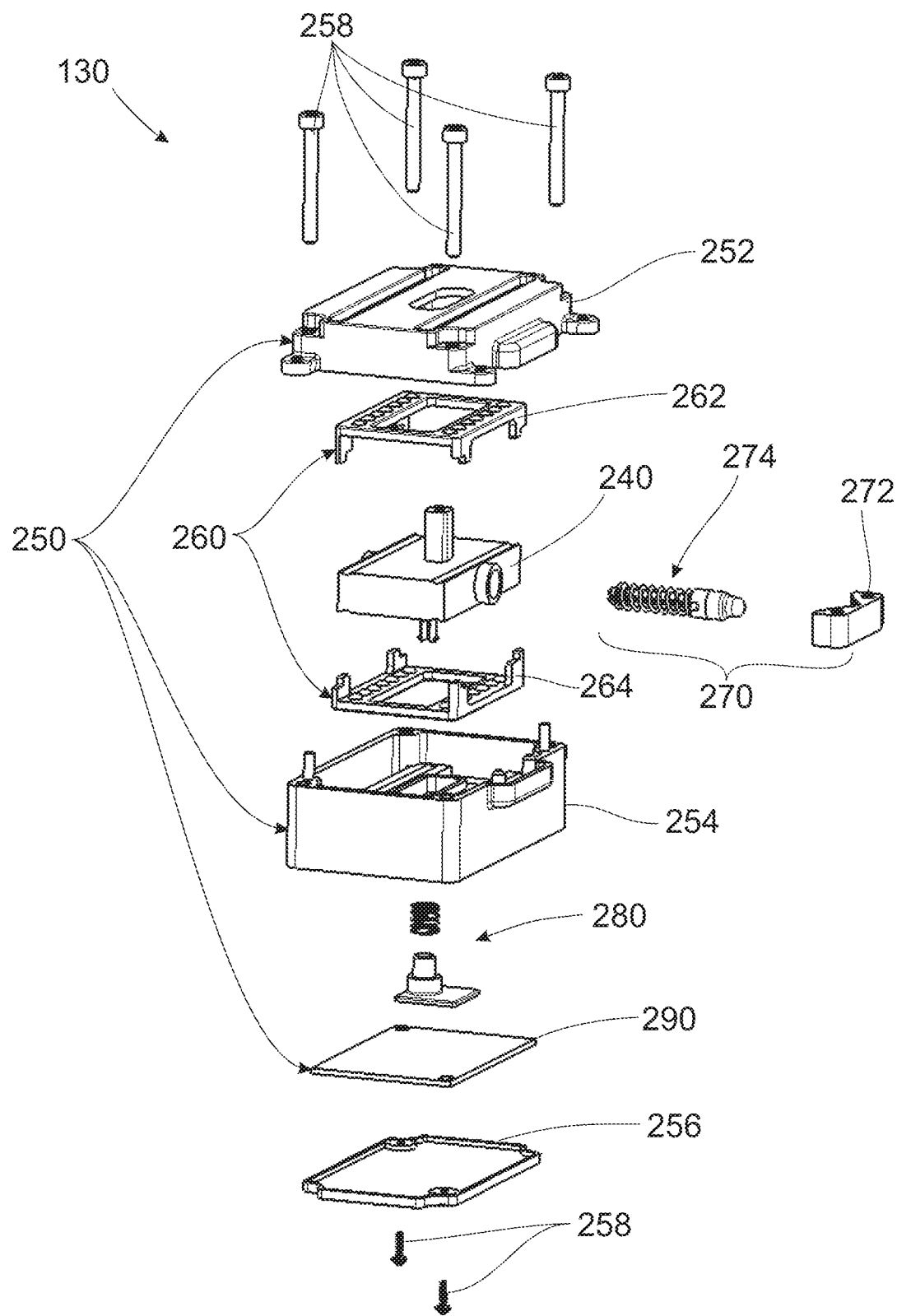
FIG. 2 shows a schematic illustration of a selector device according to an exemplary embodiment.

FIG. 2 shows a schematic illustration of a selector device 130 according to an exemplary embodiment. The selector device 130 corresponds to or is similar to the selector device shown in FIG. 1. The selector device 130 is shown in an exploded view in FIG. 2. The selector device 130 is a selector device 130 for a user input for shifting a vehicle transmission, e.g. the vehicle transmission shown in FIG. 1, to which the selector device 130 can be connected for signal transfer.

The selector device 130 contains a slider unit 240, a housing unit 250, and ball bearing unit 260. The slider unit 240 is designed such that it can be coupled to the selector knob for the user input. The housing unit 250 is designed to receive the slider unit 240, more precisely, to receive at least the slider unit 240. The slider unit 240 can be moved in a translatory manner, or displaced linearly, in relation to the housing unit 250, when the selector device 130 is assembled. The ball bearing unit 260 is designed to guide the slider unit 240 linearly in the housing unit 250, or to function as a linear guide for the slider unit 240 in the housing unit 250.

According to the exemplary embodiment shown herein, the ball bearing unit 260 has a ball cage for retaining the balls, or is designed as a ball cage. The ball bearing unit 260 in the form of a ball cage is designed to at least partially receive the slider unit 240. The ball bearing unit 260 in the form of a ball cage has an upper part 262 and a lower part 264 for retaining the balls. The slider unit 240 is located between the upper part 262 and the lower part 264. The upper part 262 and lower part 264 are designed to encompass at least sections of the slider unit 240.

Furthermore, the housing unit 250 has numerous parts in this exemplary embodiment. The housing unit 250 therefore has an upper housing part 252, a lower housing part 254, and a base place 256. At least the slider unit 250 and the ball bearing unit 260 can be placed between the upper housing part 252 and the lower housing part 254. The upper housing part 252 and the lower housing part 254 can be attached to one another. The base plate 256 can be attached to the lower housing part 254.

The slider unit 240 is located between the upper part 262 and the lower part 264 of the ball bearing unit 260 in the exploded illustration in FIG. 2, wherein the upper part 262 of the ball bearing unit 260 is located between the slider unit 240 and the upper housing part 252, and the lower part 264 of the ball bearing unit 260 is located between the slider unit 240 and the lower housing part 254.

According to the exemplary embodiment shown in FIG. 2, the selector device 130 also has fasteners 258, a latching mechanism 270 with a latching connector 272 and a latching unit 274, a sensor device 280 with a sensed element (concealed in the illustration in FIG. 2), and a printed circuit board 290.

The upper housing part 252, lower housing part 254 and base plate 256 can be attached to one another by fasteners 258. The fasteners 258 are formed by screws, or rivets, etc. By way of example, the upper housing part 252 and lower housing part 254 can be attached to one another by four fasteners 258. The base plate 256 can be attached to the lower housing part 254 by two fasteners 258.

The latching mechanism 270 contains the latching connector 272 and the latching unit 274. The latching connector 272 can be attached to the housing unit 250, specifically the lower housing unit 254. The latching unit 275 can be attached to the slider unit 240. The latching mechanism 270 can be received between the upper housing part 252 and the lower housing part 254. The latching connector 272 and the latching unit 274 are designed to interact when the selector device 130 is assembled, to tighten the slider unit 240 in place, in a resting position in relation to the housing unit 250. The slider unit 240 can be displaced along the actuation axis from the resting position with a user input, wherein the slider unit 240 is returned to the resting position by the latching mechanism 270 or the latching connector 272 and the latching unit 274, after the user input.

The sensor device 280 can be attached to the slider unit 240. The sensor device 280 contains the sensed element. The sensed element is designed to be detected by a detection device to determine a relative position of the slider unit 240 in relation to the housing unit 250. The printed circuit board 290 contains a detection device (not shown explicitly herein) for determining the relative position of the slider unit 240 to the housing unit 250. The detection device is designed to determine the relative position using a capacitive and/or magnetic detection principle. The sensor device 280 is located between the lower housing part 254 and the printed circuit board 290. The printed circuit board 290 is located between the sensor device 280 and the base plate 256.

Numerous elements in the selector device 130 shall be explained in greater detail below in reference to the other figures.

Figure 3:
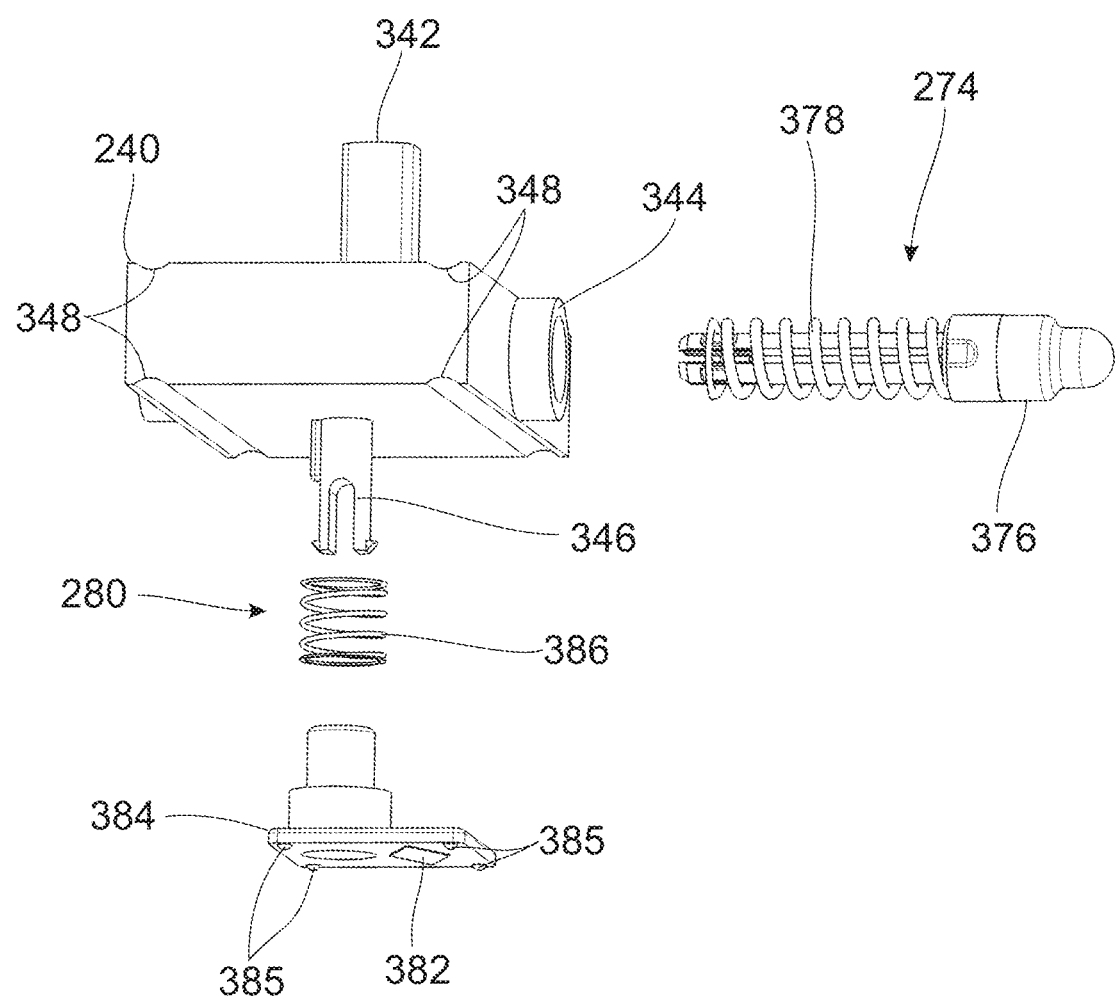
FIG. 3 shows a schematic illustration of parts of the selector device shown in FIG. 2.

FIG. 3 shows a schematic illustration of parts of the selector device shown in FIG. 2. The slider unit 240, latching unit 274, and sensor device 280 in the selector device are shown in an exploded illustration in FIG. 3.

The slider unit 240 has a coupling element 342 coupled to the selector knob, an attachment element 344 for attaching the latching unit 274, fastening element 346 for fastening the sensor device 280, and grooves 348 forming a rolling path for the balls in the ball bearing unit. The slider unit 240 has a cuboid shape. According to the exemplary embodiment shown here, the slider unit 240 has four grooves 348. In this case, two grooves 348 are formed on each of the main surfaces of the body of the slider unit 240. The coupling element 342 extends in the form of a pin or projection from the first of the two main surfaces, away from the body. The fastening element 346 extends in the form of a pin or projection with latching lugs from the second of the two main surfaces, away from the body. The coupling element 342 and the fastening element 346 therefore extend in opposite directions away from the body. The attachment element 344 has a hole in a lateral surface of the body, for attaching the latching unit 274.

The latching unit 274 has a latching pin 376 and an elastic element 378. The elastic element 378 is in the form of a helical spring that is slid over a section of the latching pin 376. The latching pin 376 is designed to snap into the hole in the attachment element 344 of the slider unit 240 at an attachment end, and be attached such that is can slide. An engagement end of the latching pin 376 facing away from the attachment end is designed to engage in the latching connector when the selector device is assembled. The engagement end of the latching pin 376 is rounded. The latching unit 275 is therefore held away from the slider unit 240 and can be placed on the slider unit to engage in the latching connector.

The sensor device 280 contains the sensed element 382, a retaining element 384, and another elastic element 386. The sensed element 382 is in the shape of a rhombus. By way of example the sensed element 382 is a metal plate in the shape of a rhombus. In particular, the sensed element 382 is made of a material that can be detected by means of a capacitive and/or magnetic detection principle. The sensed element 382 is located on the retaining element 384. The retaining element 384 can be fastened to or placed on the fastening element 346 of the slider unit 240 by snapping it in place. The retaining element 384, and therefore the sensed element 382 can be held away from the slider unit by means of the other elastic element 386. The retaining element 384 can therefore be held away from the slider unit, in order to come in contact with the printed circuit board in the selector device. There are four contacts 385 on the retaining element 384 according to this exemplary embodiment, which come in contact with the printed circuit board.

Figure 4:
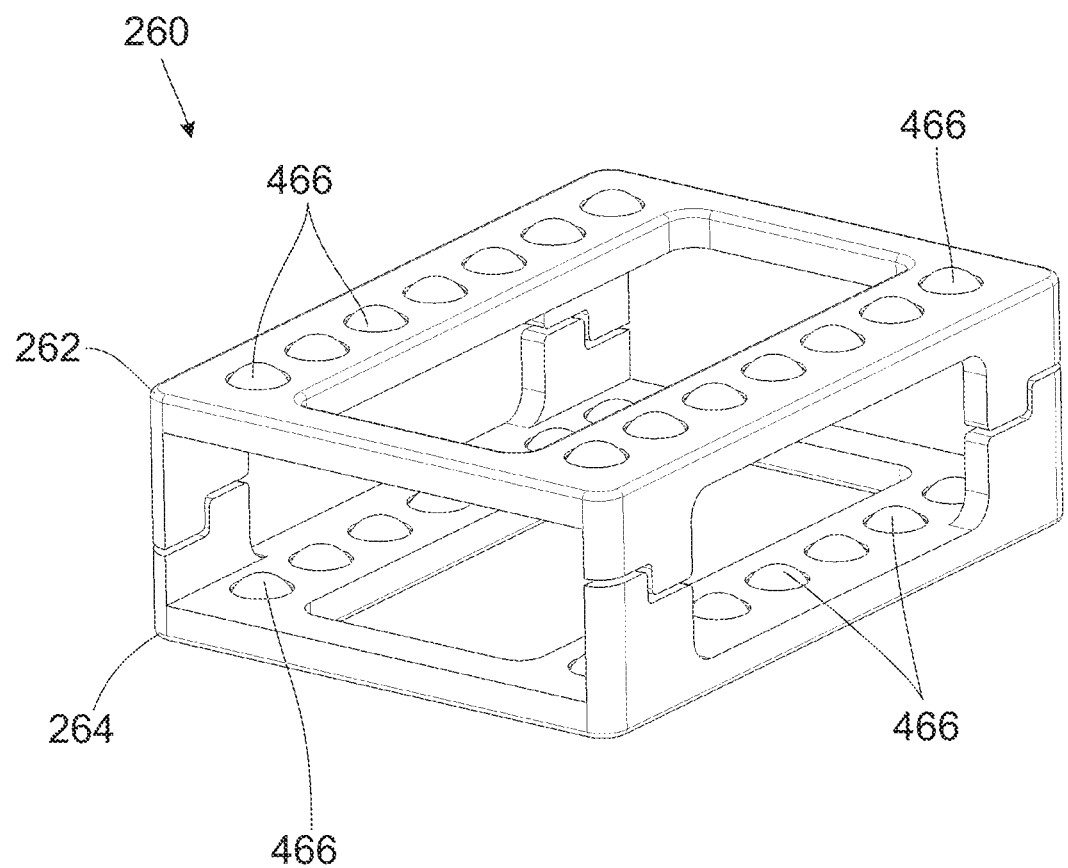
FIG. 4 shows a schematic illustration of parts of the selector device shown in FIG. 2.

FIG. 4 shows a schematic illustration of parts of the selector device shown in FIG. 2. From the selector device, the ball bearing unit 260 designed as a ball cage is shown with the upper part 262 and the lower part 264 in FIG. 4. The upper part 262 and lower part 264 are connected to the ball cage. The ball cage has a square layout. The ball cage has a window, or opening, on each of its six sides or surfaces, or outer surfaces.

The ball bearing unit 260 contains numerous balls 466. The upper part 262 and lower part are designed to retain the numerous balls 466. Numerous openings are formed for this in the upper part 262 and lower part 264. The openings are in two parallel rows in the upper part 262 and two parallel rows in the lower part 264. Indents are formed in the openings in the ball bearing unit 260 for retaining the balls 466.

Figure 5:
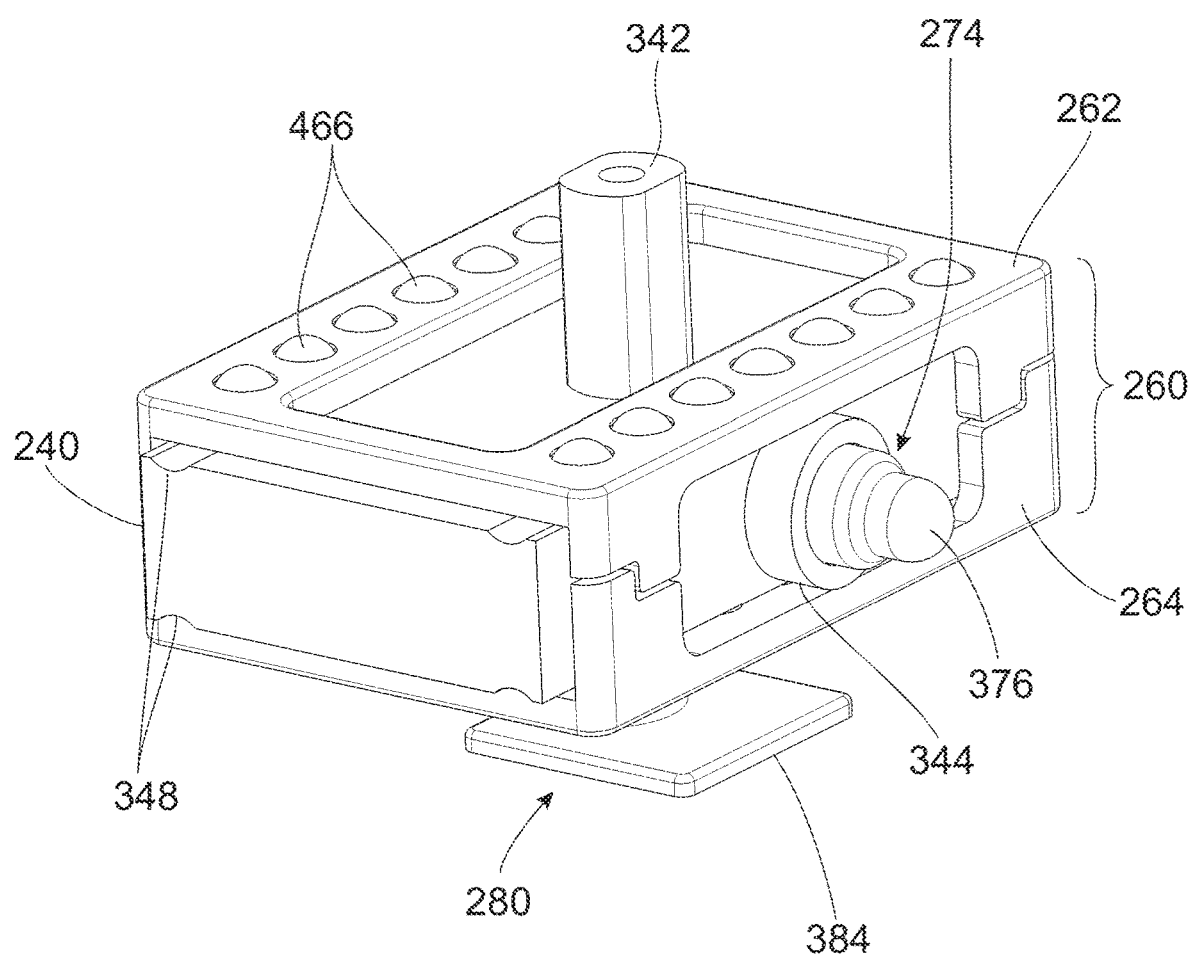
FIG. 5 shows a schematic illustration of parts of the selector device shown in FIG. 2.

FIG. 5 shows a schematic illustration of parts of the selector device shown in FIG. 2. From the selector device, the slider unit 240 with the coupling element 342, the attachment element 344 and the grooves 348, the ball bearing unit 260 with the upper part 262, lower part 264 and balls 466, the latching unit 274 with the latching pin 376 and the sensor device 280 with the retaining element 384 are shown in FIG. 5. In other words, the parts of the selector device shown in FIG. 3 and FIG. 4 are shown in FIG. 5. In this case, the parts of the selector device shown in FIGS. 3 and 4, i.e. the slider unit 240, ball bearing unit 260, latching unit 274 and sensor device 280, are shown in the assembled state.

The slider unit 240 is partially received or placed in the ball bearing unit 260 here. The latching unit 274 is also attached to the attachment element 344 of the slider unit 240, wherein only a section of the latching pin 376 extends from the slider unit 240. The sensor device 280 is also fastened to or located on the slider unit 240. The coupling element 342 of the slider unit 240 protrudes from the upper part 262 of the ball bearing unit 260. The retaining element 384 protrudes from the lower part 264 of the ball bearing unit 260. The latching pin 376 protrudes from the ball bearing unit 260. To reinforce the linear guidance of the slider unit 240 by the ball bearing unit 260, the attachment element 344 protrudes into one of the windows in the ball bearing unit 260 designed as a ball cage. It can also be seen in FIG. 5 that the balls 466 in the ball bearing unit 260 engage in the grooves 348.

Figure 6:
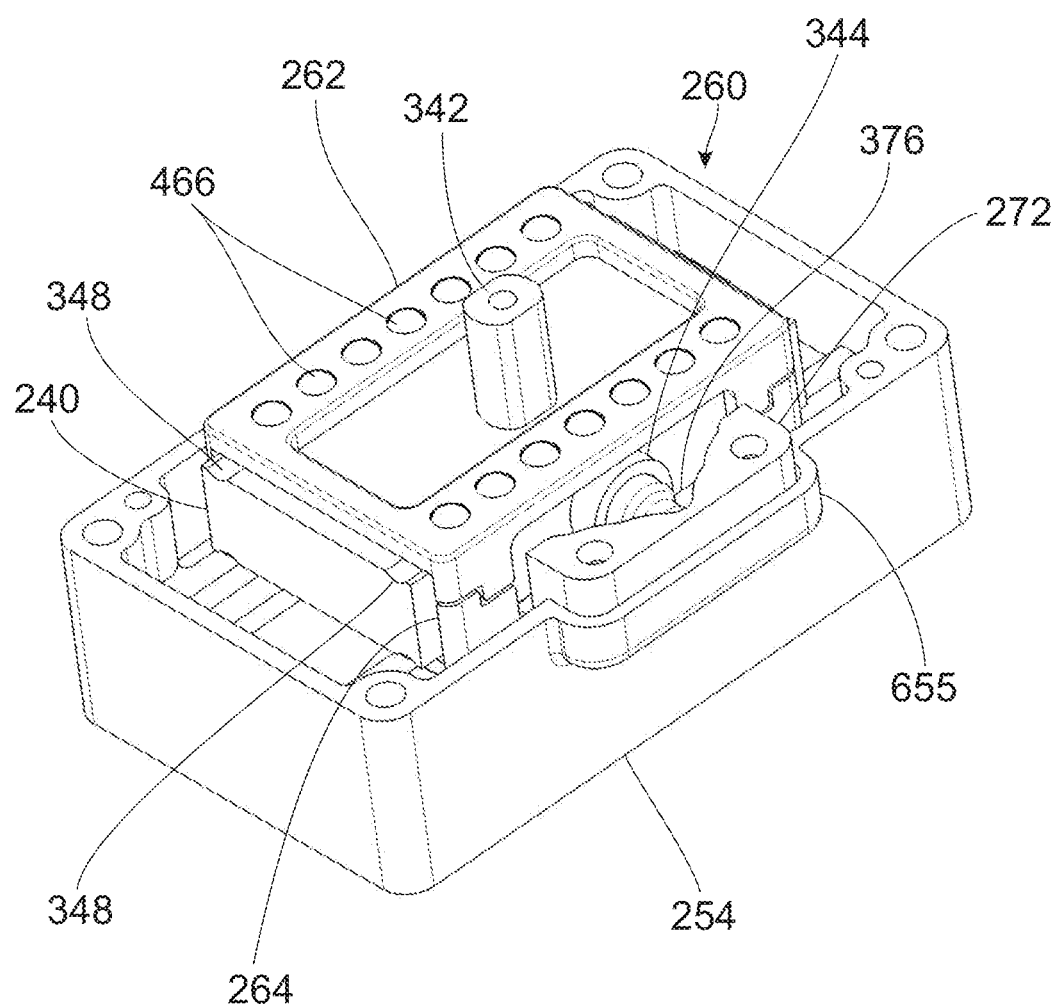
FIG. 6 shows a schematic illustration of parts of the selector device shown in FIG. 2.

FIG. 6 shows a schematic illustration of parts of the selector device shown in FIG. 2. The parts of the selector device shown in FIG. 5, as well as the latching connector 272 are located or placed in the lower housing part 254 in FIG. 6, wherein the retaining element is concealed in this illustration. The lower housing part 254 has a receiving recess 655 for receiving part of the latching connector 272. The latching connector 272 is partially located in the receiving recess 655. The latching connector 272 is placed in the receiving recess 655 in this case.

Figure 7:
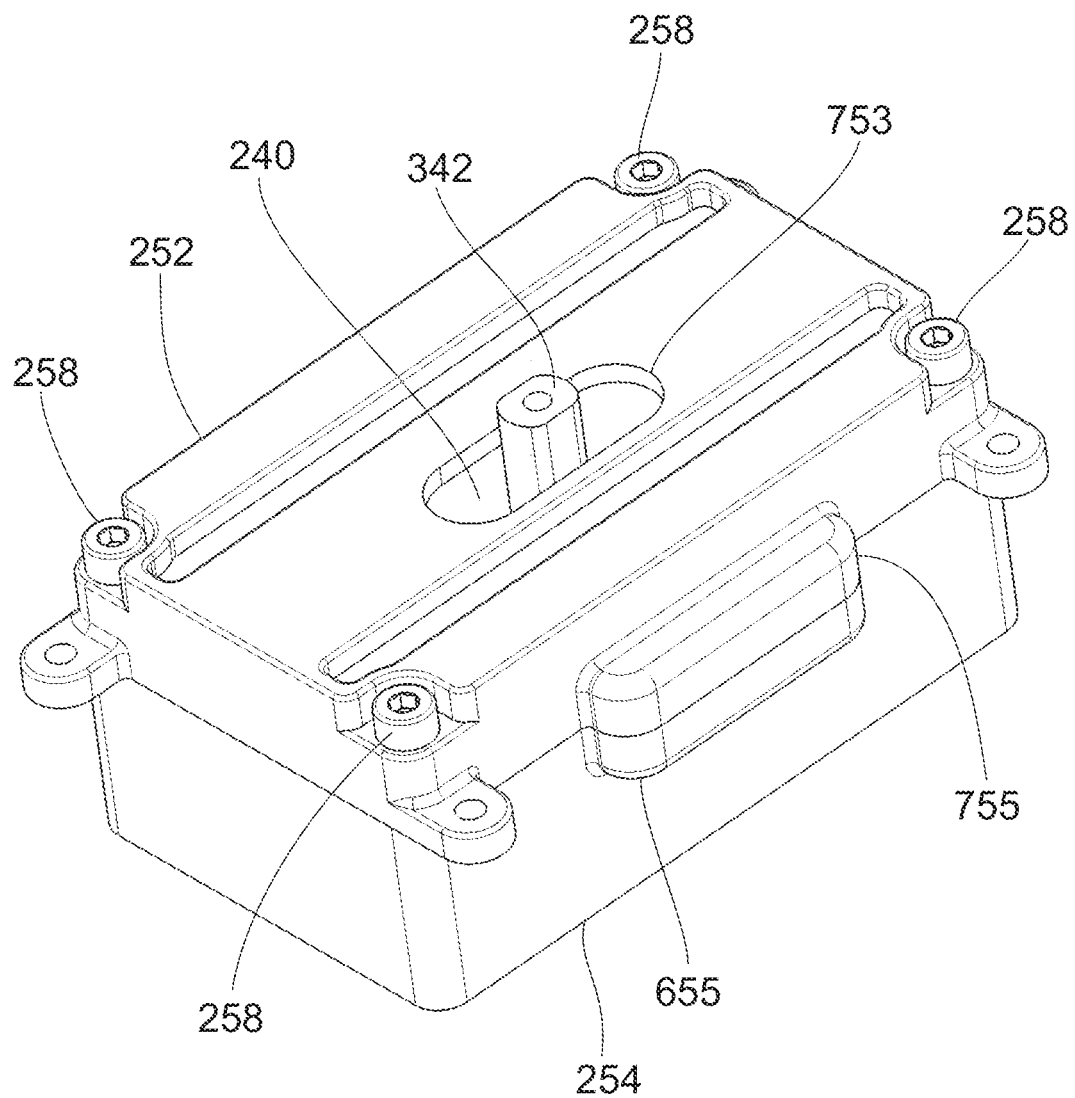
FIG. 7 shows a schematic illustration of parts of the selector device shown in FIG. 2.

FIG. 7 shows a schematic illustration of parts of the selector device shown in FIG. 2. The parts are of the selector device are shown in FIG. 7 in a diagonal perspective from above. The parts of the selector device shown in FIG. 6 and the upper housing part 252 and fasteners 258 are shown in FIG. 7, wherein the upper housing part 252 is connected to the lower housing part 254 with four fasteners 258. From the selector device, part of the slider unit 240 with the coupling element 342, the upper housing part 252 with an oblong hole 753 and a receiving recess 755, the lower housing part 254 with the receiving recess 655, and four fasteners 258, are shown in FIG. 7.

The upper housing part 252 has the oblong hole 753 and the receiving recess 755. The coupling element 342 of the slider unit 240 extends through the oblong hole 753, protruding from the upper housing part 252. The receiving recess 755 in the upper housing part 252 is designed to receive a part of the latching connector. The receiving recess 655 in the lower housing part 254 and the receiving recess 755 in the upper housing part 252 collectively form a receiving recess for the latching connector, or partially encompass the latching connector, and secure it in the housing unit, when the upper housing part 252 and the lower housing part 254 are joined to one another.

The upper housing part 252 also has numerous mount elements with which the selector device is installed in the vehicle. These mount elements are in the form of eyelets in particular.

Figure 8:
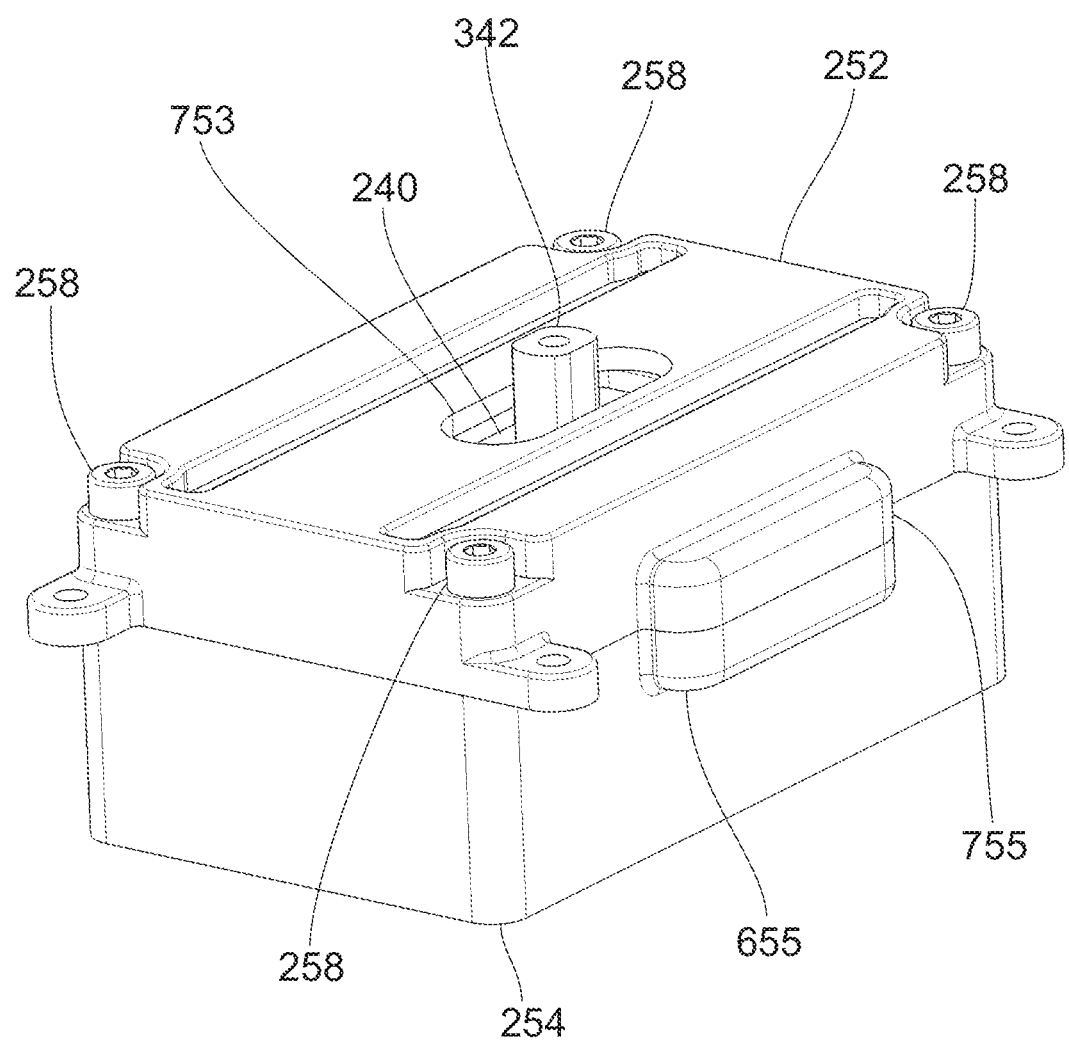
FIG. 8 shows a schematic illustration of the part of the selector device shown in FIG. 7.

FIG. 8 shows a schematic illustration of the parts of the selector device shown in FIG. 7. The illustration in FIG. 8 corresponds to that in FIG. 7, with the exception that the parts of the selector device are shown diagonally from above.

Figure 9:
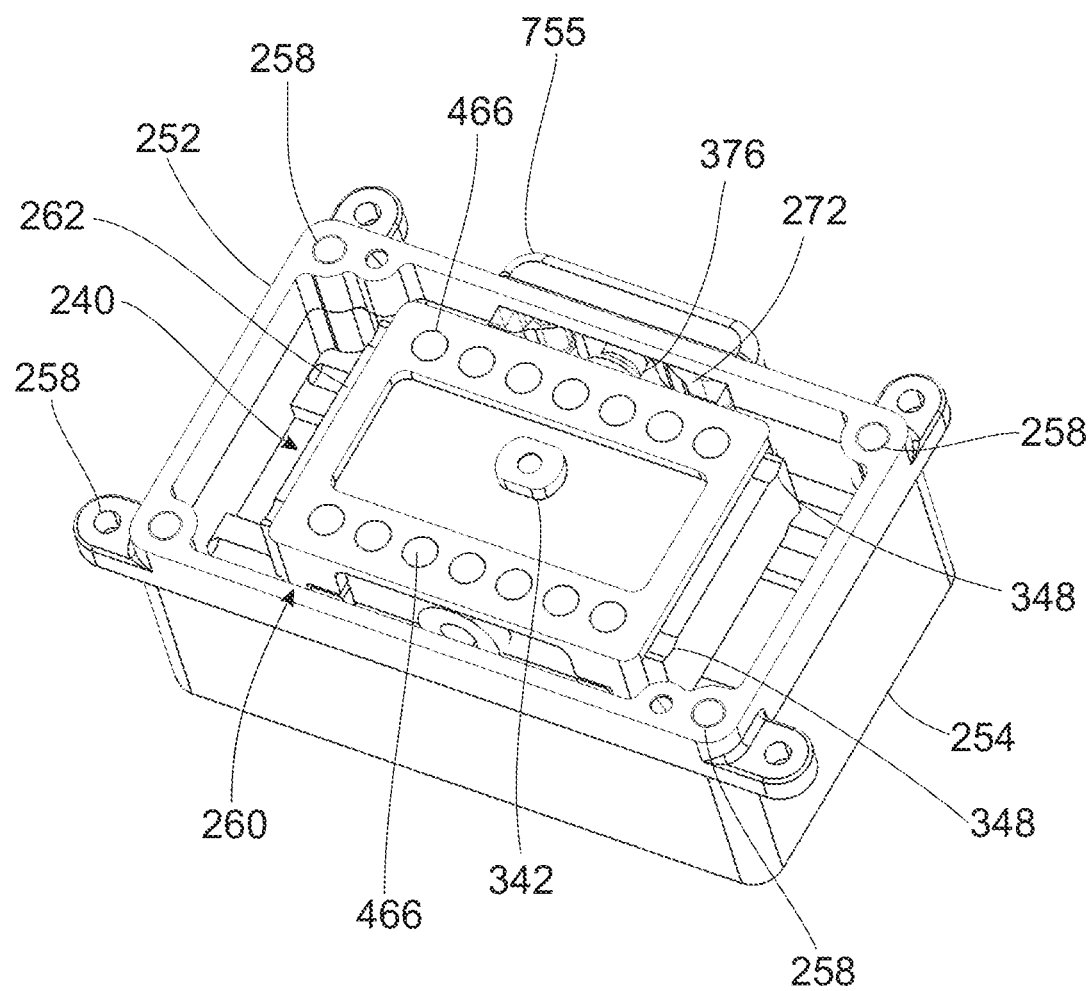
FIG. 9 shows a schematic partially cutaway illustration of the part of the selector device shown in FIGS. 7 and 8.

FIG. 9 shows a schematic partially cutaway view of the parts of the selector device shown in FIG. 7 and FIG. 8. The parts of the selector device shown in FIG. 7 and FIG. 8 are cut therein along the actuation axis indicated in FIG. 1, wherein the cutting plane passes through the upper housing part 252, the four fasteners 258, the upper part 262 of the ball bearing unit 260 as well as the balls 466 retained in the upper part 262, and the coupling element 342 of the slider unit 240.

From the selector device, the slider unit 240, the upper housing part 252, the lower housing part 254, four fasteners 258, the ball bearing unit 260, the upper part 262 of the ball bearing unit 260, the latching connector 272, the coupling element 342 of the slider unit 240, the grooves 348 in the slider unit 240, the latching pin 376, the balls 466 retained in the upper part 262 of the ball bearing unit 260, and the receiving recess 755 in the upper housing part 252 are shown in FIG. 9.

Figure 10:
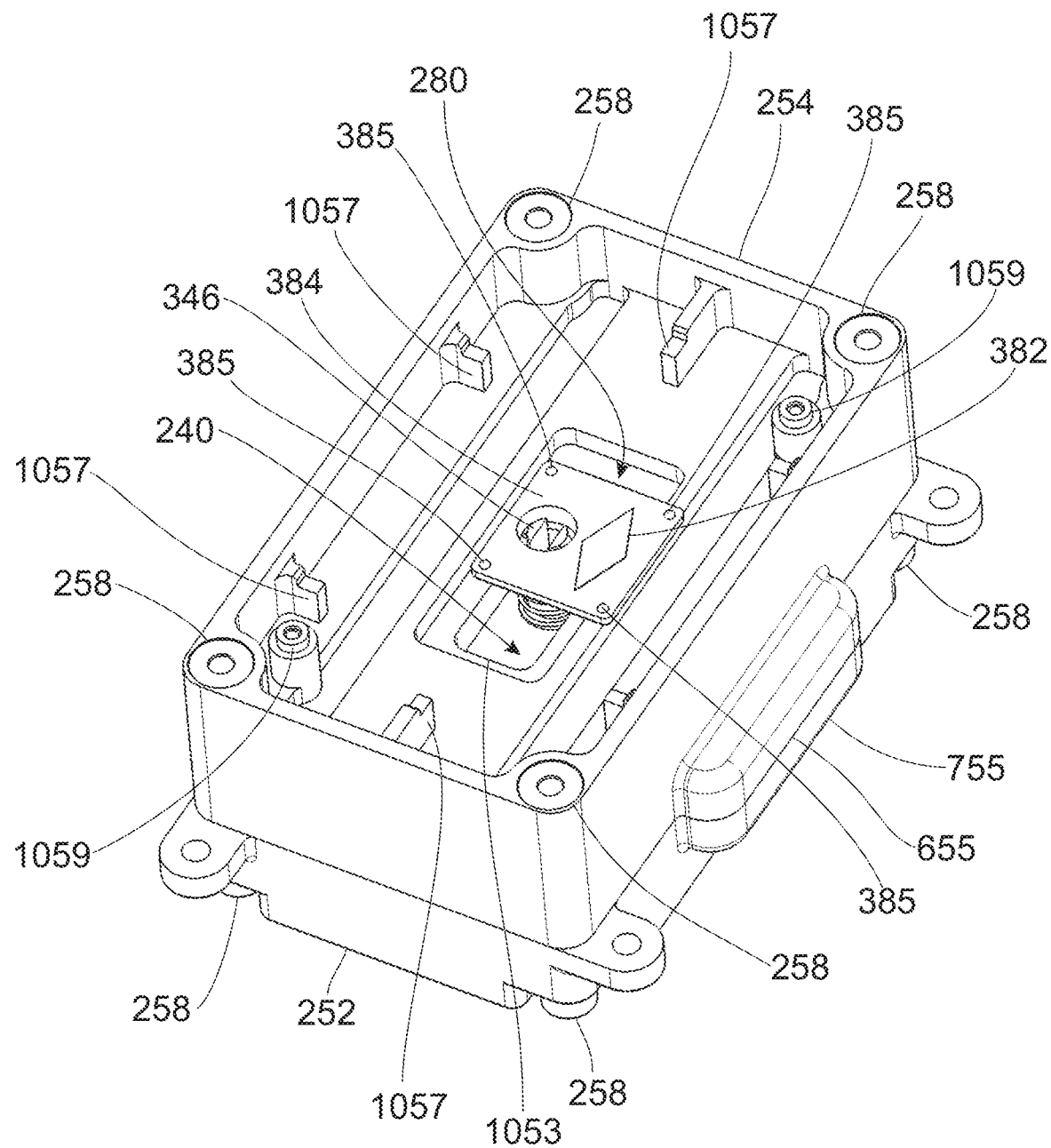
FIG. 10 shows a schematic illustration of the part of the selector device shown in FIGS. 7 to 9.

FIG. 10 shows a schematic illustration of the parts of the selector device shown in FIGS. 7 to 9. These parts of the selector device are shown in FIG. 10 in a diagonal perspective from below. From the selector device, a part of the slider unit 240, the upper housing part 252, the lower housing part 254, four fasteners 258, the sensor device 280, the fastening element 356, the sensed element 382, the retaining element 384, the contacts 385, the receiving recess 655 in the upper housing part 252, the receiving recess 755 in the lower housing part 254, as well as an oblong hole 1053 in the lower housing part 254, numerous positioning webs 1057 for positioning the printed circuit board, and merely by way of example, two securing elements 1059 for securing the printed circuit board and the base plate in place, are shown in FIG. 10.

The fastening element 346 of the slider unit 240 extends through the oblong hole 1053 in the lower housing part 254. A wall of the lower housing part 254 is therefore located between the sensor device 280 and the slider unit 240. The positioning webs 1057 and the securing elements 1059 of the lower housing part 254 are located in a region in the outer wall of lower housing part 254. The positioning webs 1057 are designed as bearing surfaces for the printed circuit board. The securing elements 1059 form hollow cylindrical pillars. The securing elements 1059 are stepped. According to one exemplary embodiment, the securing elements 1059 have an internal threading for fasteners 258.

Figure 11:
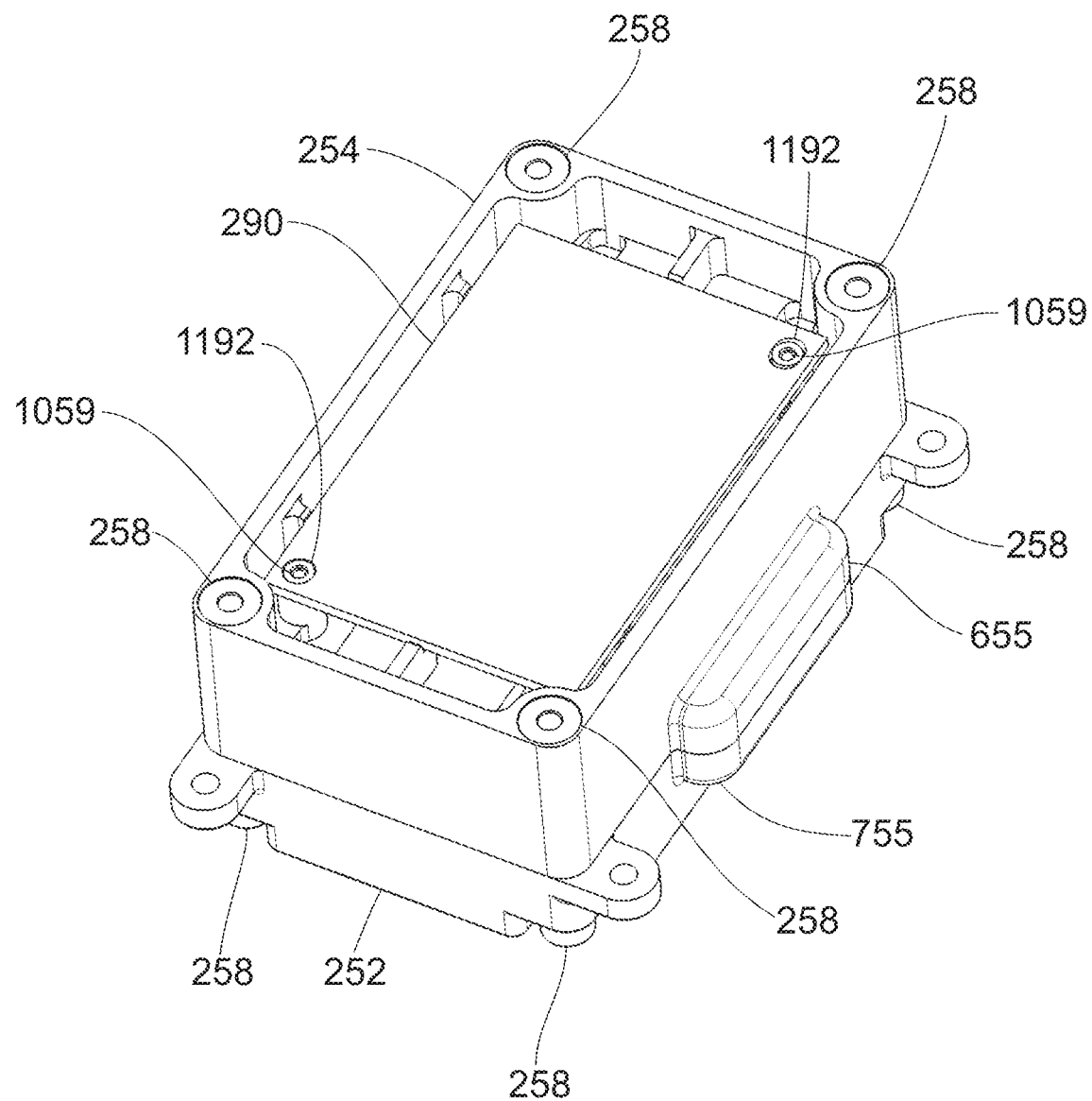
FIG. 11 shows a schematic illustration of the part of the selector device shown in FIG. 10, and the printed circuit board shown in FIG. 2.

FIG. 11 shows a schematic illustration of the parts of the selector device shown in FIG. 10 and the printed circuit board 290 shown in FIG. 2. The illustration in FIG. 11 corresponds to the illustration in FIG. 10 with the exception that the printed circuit board 290 on which the lower housing part 254 is located is also shown, wherein the oblong hole 1053 in the lower housing part 254, the slider unit 240, and the sensor device 280 are covered by the printed circuit board 290. From the selector device, the upper housing part 252, the lower housing part 254, four fasteners 258, the printed circuit board 290, the receiving recess 655 in the upper housing part 252, the receiving recess 755 in the lower housing part 254, the securing elements 1059, and securing holes 1192 in the printed circuit board 290 are shown in FIG. 11.

Figure 12:
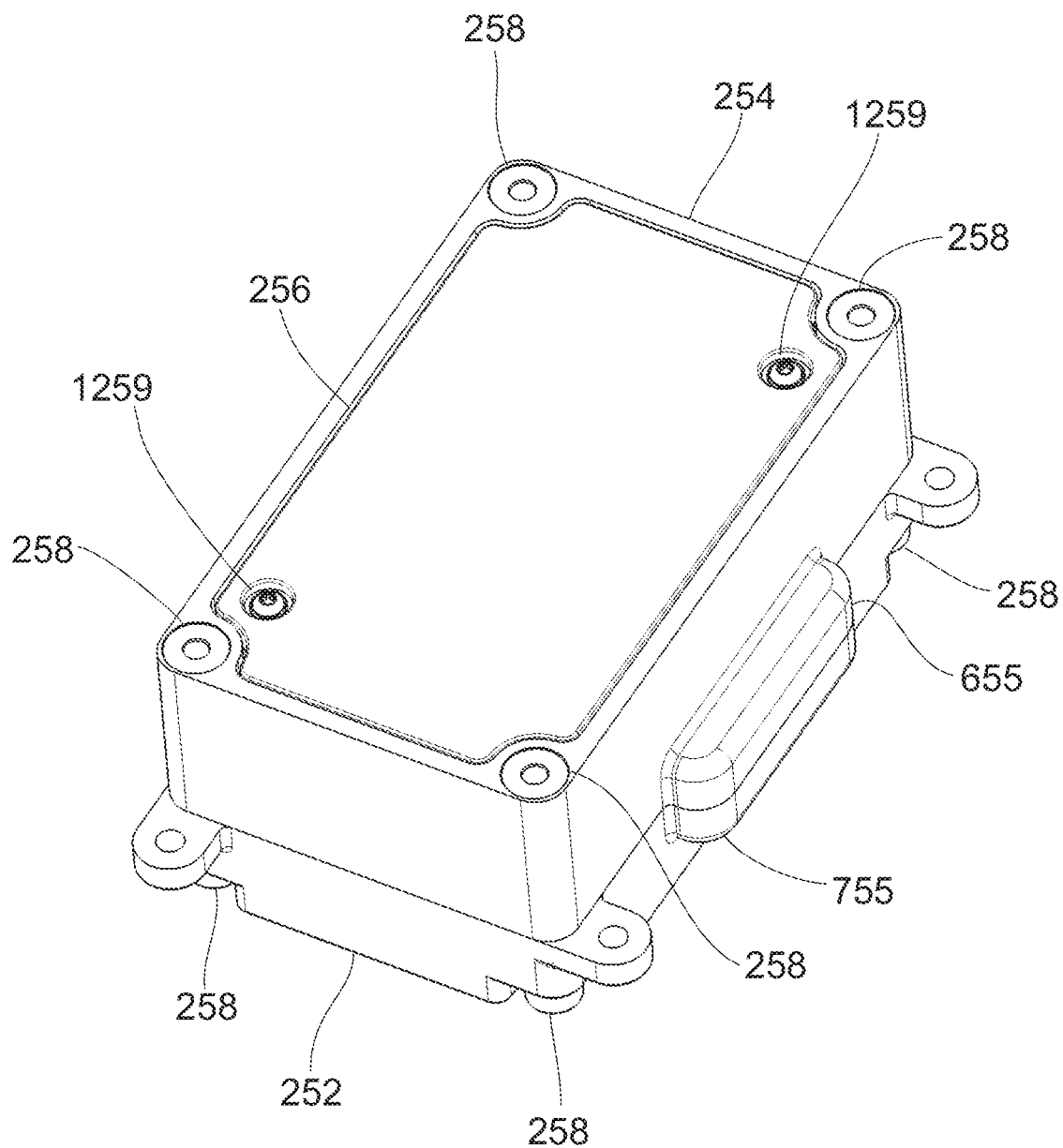
FIG. 12 shows a schematic illustration of the part of the selector device shown in FIG. 11 and the base plate shown in FIG. 2.

FIG. 12 shows a schematic illustration of the parts of the selector device shown in FIG. 11 and the base plate 256 shown in FIG. 2. The illustration in FIG. 12 corresponds to that in FIG. 11 with the exception that the base plate 256 is also shown, on which the lower housing part 254 is located, wherein the printed circuit board 290 in particular is concealed. From the selector device, the upper housing part 252, the lower housing part 254, the base plate 256, four fasteners 258, the receiving recess 655 in the upper housing part 252, the receiving recess 755 in the lower housing part 254, and fastening holes 1259 in the base plate 256 are shown in FIG. 12. Fasteners can be inserted through the fastening holes 1259 into the securing holes in the printed circuit board and into the securing elements in the lower housing part 254 to attach the base plate 256 to the lower housing part 254, and therefore also securing the printed circuit board in place.

In reference in particular to FIGS. 3, 5, 6, 7, 11, and 12, and taking FIG. 2 into account, an assembly, or an assembly method can be derived for assembling or piecing together the selector device 130.

Figure 13:
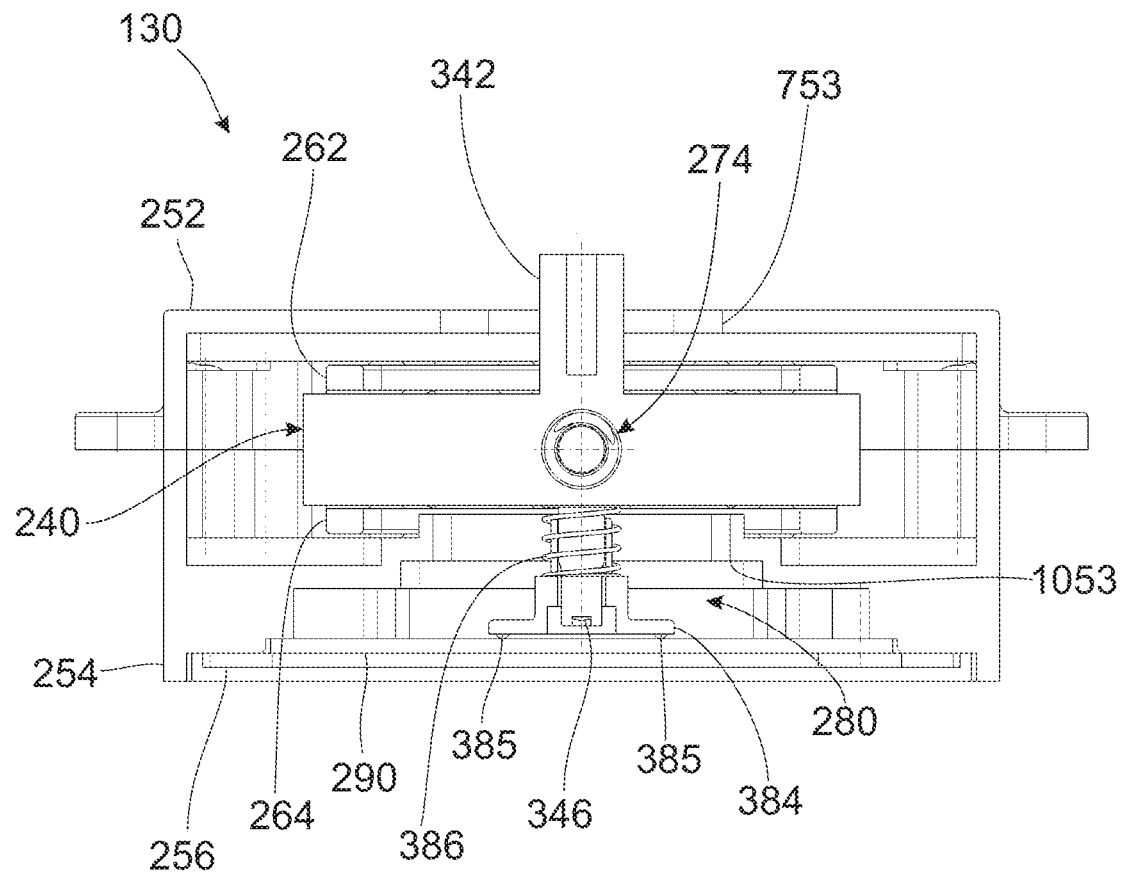
FIG. 13 shows a schematic partially cutaway illustration of the selector device shown in FIG. 2 in an assembled state.

FIG. 13 shows a schematic partially cutaway illustration of the assembled selector device 130 shown in FIG. 2. The parts of the selector device 130 shown in FIG. 2 are fit together, or assembled, as shown in FIG. 12, and cut along the actuation axis shown in FIG. 1. The cutting plane in FIG. 13 is orthogonal to the cutting plane in FIG. 9. The cutting plane passes through the slider unit 240 and the coupling element 342, the upper housing part 252, the lower housing part 254, the upper part 262 and lower part 264 of the ball bearing unit, the latching unit 274 of the latching mechanism, the retaining element 384 and the other elastic element 386 in the sensor device 280, the printed circuit board 290, and the base plate 256.

From the selector device 130, the slider unit 240 with the coupling element 342 and the fastening element 346, the upper housing part 252, the lower housing part 254, the base plate 266, the upper part 262 and lower part 264 of the ball bearing unit, the latching unit 274 in the latching mechanism, the printed circuit board 290, the retaining element 384, the contacts 385, and the other elastic element 386 in the sensor device, the oblong hole 753 in the upper housing part 252 and the oblong hole 1053 in the lower housing part 254 are shown in the illustration in FIG. 13.

Figure 14:
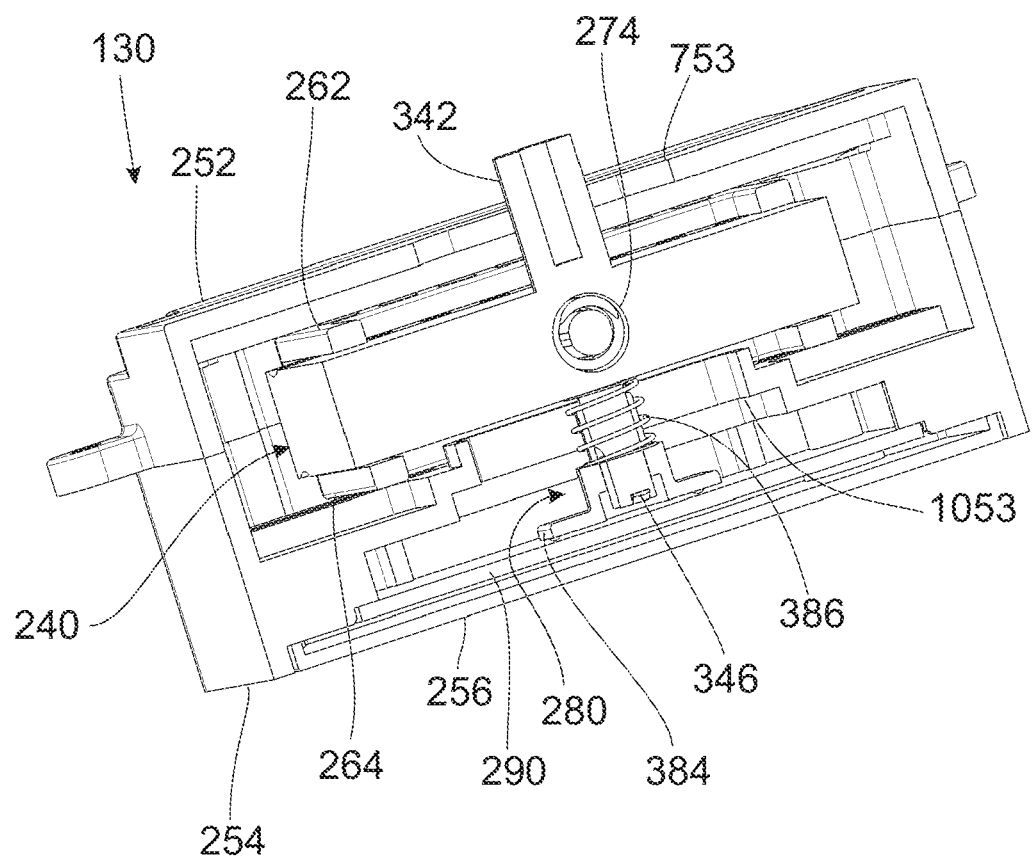
FIG. 14 shows a schematic partially cutaway illustration of the selector device shown in FIG. 2 in an assembled state.

FIG. 14 shows a schematic partially cutaway illustration of the assembled selector device 130 shown in FIG. 2. The illustration in FIG. 14 corresponds to that in FIG. 13 with the exception that the partially cutaway illustration in FIG. 14 is shown diagonally and tilted, wherein the contacts in the sensor device are concealed in the illustration.

Figure 15:
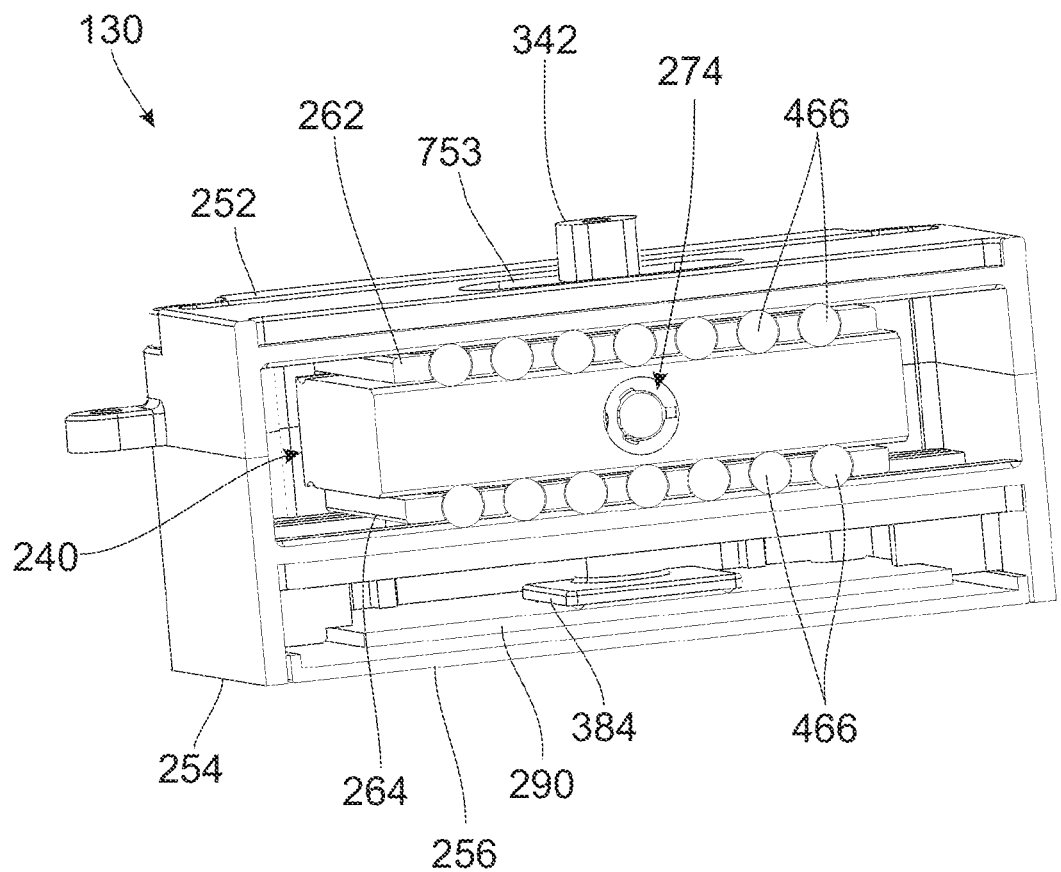
FIG. 15 shows a schematic partially cutaway illustration of the selector device shown in FIG. 2 in an assembled state.

FIG. 15 shows a schematic partially cutaway illustration of the selector device 130 shown in FIG. 2 in the assembled state. The parts of the selector device 130 shown in FIG. 2 are pieced together or assembled, as shown in FIG. 12, and cut along the actuation axis shown in FIG. 1. The cutting plane is parallel to the cutting planes in FIG. 13 and FIG. 14. More precisely, the cutting plane in FIG. 15 runs through the slider unit 240, including the coupling element 342, the upper housing part 252, the lower housing part 254, the upper part 262 and lower part 264, and a portion of the balls 466 in the ball bearing unit, the latching unit 274 in the latching mechanism, the retaining element 384 in the sensor device, the printed circuit board 290 and the base plate 256.

From the selector device 130, the slider unit 240 with the coupling element 342, the upper housing part 252, the lower housing part 254, the base plate 256, the upper part 262, lower part 264, and a portion of the balls 466 in the ball bearing unit, the latching unit 274 in the latching mechanism, the printed circuit board 290, the retaining element 384 in the sensor device, and the oblong hole 753 in the upper housing part 252 are shown in the illustration in FIG. 15.

Figure 16:
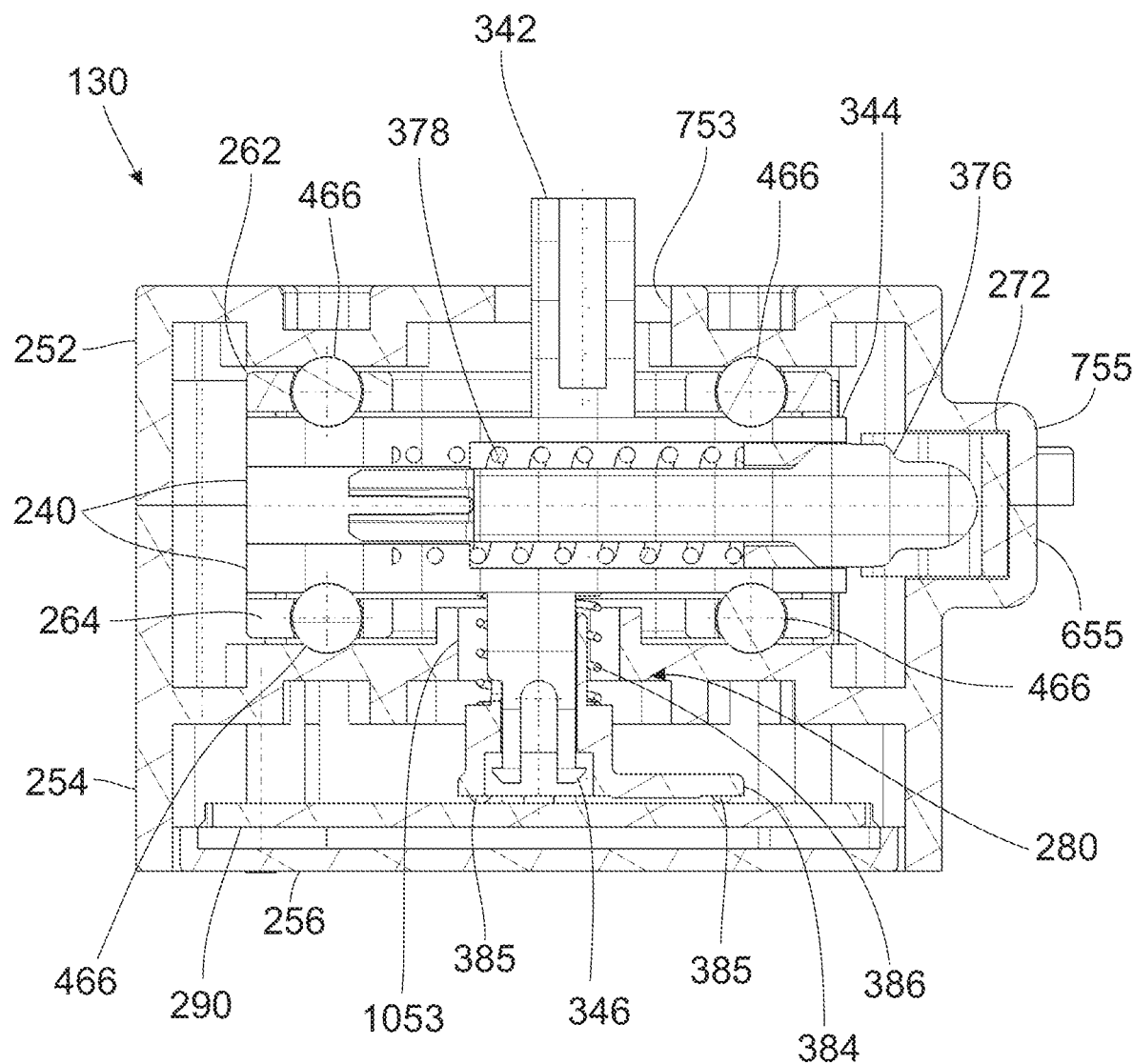
FIG. 16 shows a schematic partially cutaway illustration of the selector device shown in FIG. 2 in an assembled state.

FIG. 16 shows a schematic partially cutaway illustration of the selector device 130 shown in FIG. 2 in the assembled state. The parts of the selector device 130 shown in FIG. 2 are pieced together, or assembled, and cut in a direction transverse to the actuation axis shown in FIG. 1. The cutting plane is orthogonal to the cutting planes shown in FIG. 13, FIG. 14, and FIG. 15. More precisely, the cutting plane in FIG. 16 runs through the slider unit 240, including the coupling element 342, the attachment element 344 and fastening element 346, the upper housing part 252, including the oblong hole 753 and the receiving recess 755, the lower housing part 254, including the receiving recess 644 and the oblong hole 1053, the upper part 262, lower part 264 and a portion of the balls 466 in the ball bearing unit, the latching connector 272, latching pin 376 and elastic element 378 in the latching mechanism, the retaining element 384 and other elastic element 386 in the sensor device 280, the printed circuit board 290, and the base plate 256. Contacts 385 for the retaining element 384 in the sensor device 280 are also shown in FIG. 16.

Figure 17:
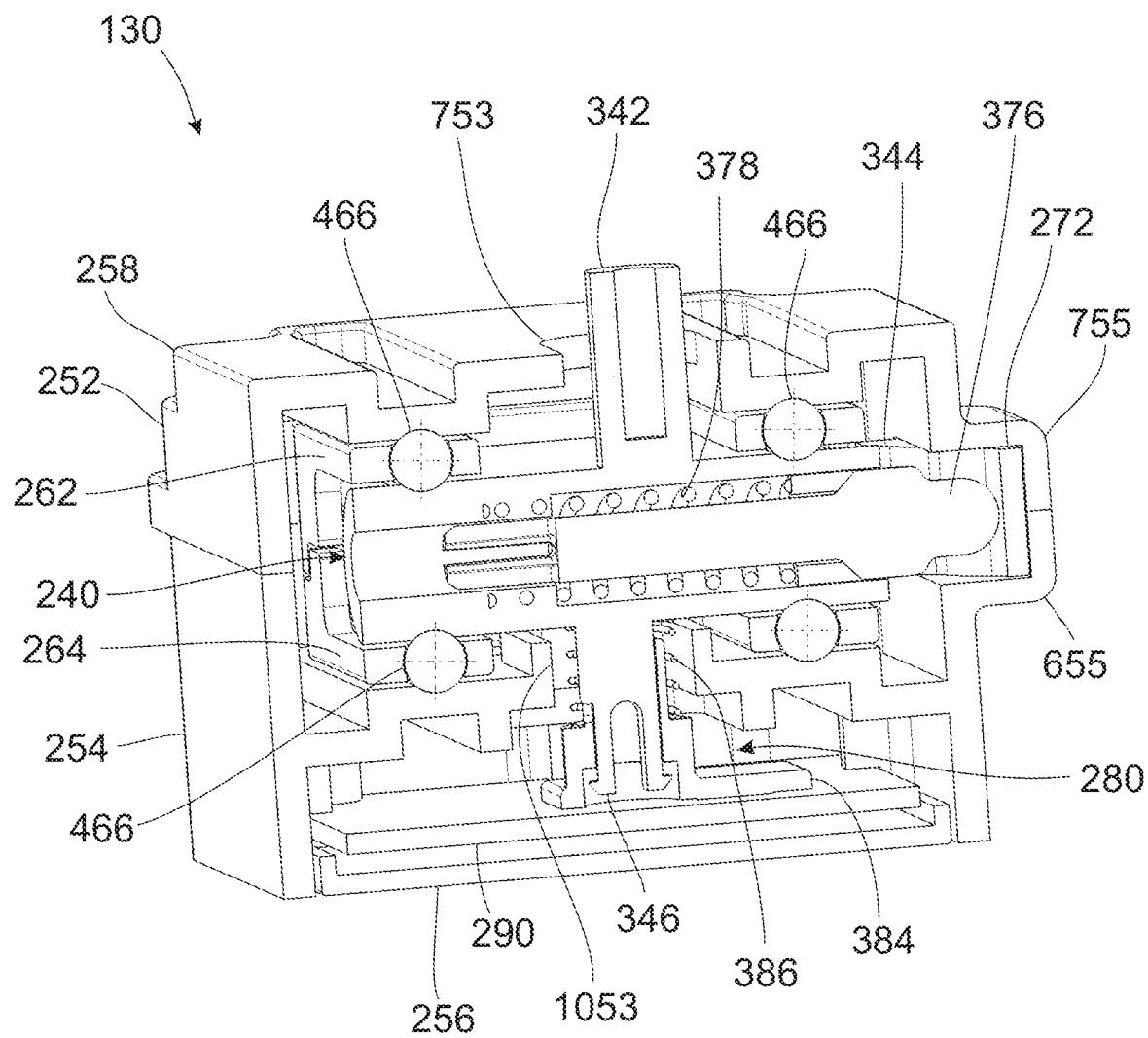
FIG. 17 shows a schematic partially cutaway illustration of the selector device shown in FIG. 2 in an assembled state.

FIG. 17 shows a schematic partially cutaway illustration of the selector device 130 shown in FIG. 2 in the assembled state. The illustration in FIG. 17 corresponds to that in FIG.

16, with the exception that the partially cutaway illustration is rotated and tilted in FIG. 17, wherein the contacts in the sensor device are concealed in the illustration, and a part of a fastener 258 is shown.

Figure 18:
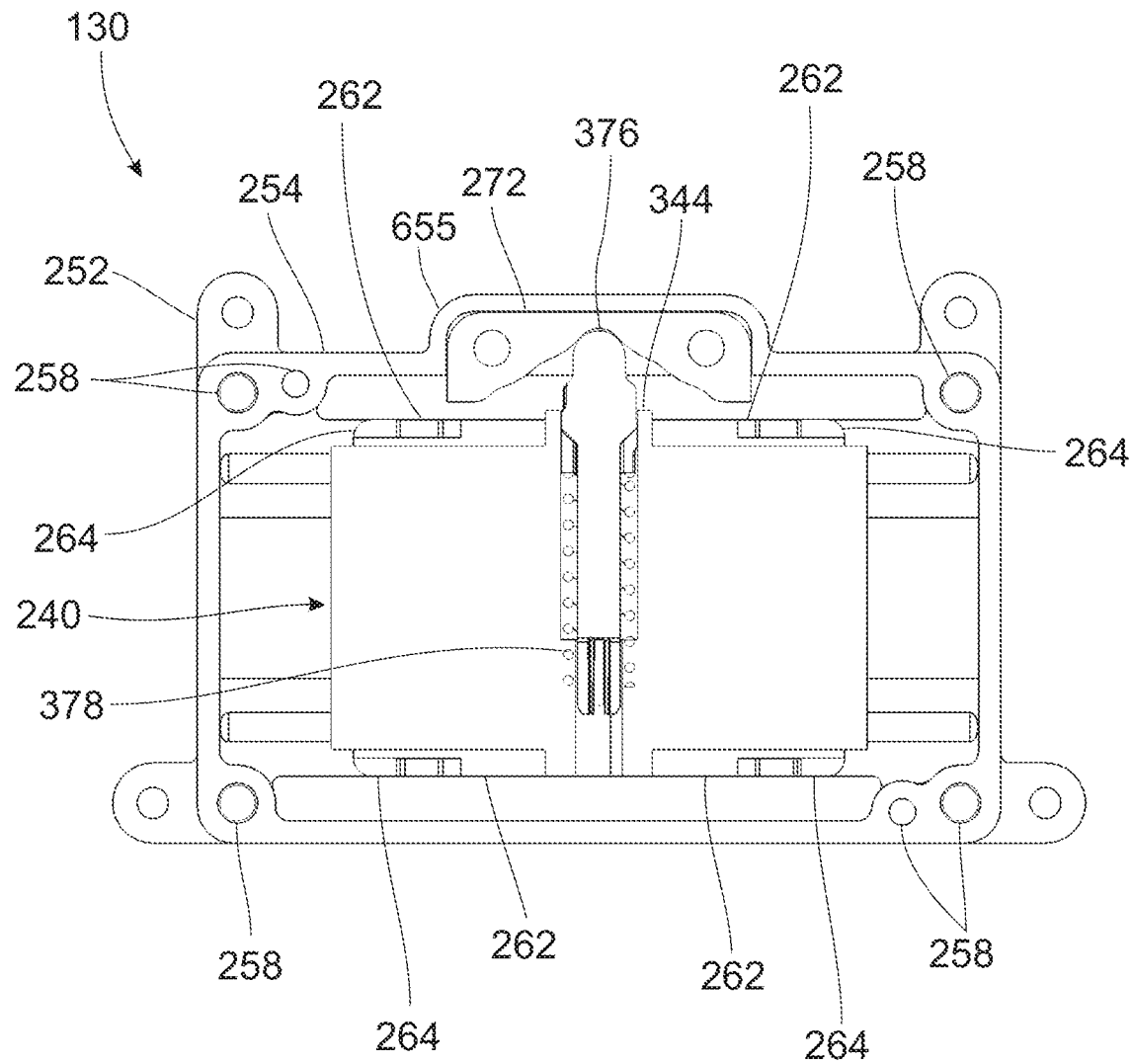
FIG. 18 shows a schematic partially cutaway illustration of the selector device shown in FIG. 2 in an assembled state.

FIG. 18 shows a schematic partially cutaway illustration of the selector device 130 shown in FIG. 2 in the assembled state. The parts of the selector device 130 shown in FIG. 2 are pieced together or assembled, and cut along the actuation axis shown in FIG. 1. The cutting plane in FIG. 18 is parallel to the cutting plane in FIG. 9. The cutting plane passes through the slider unit 240, including the attachment element 344, the lower housing part 254, including the receiving recess 655, the fasteners 258, the lower part 264 of the ball bearing unit, as well as through the latching connector 272, the latching pin 376, and the elastic element 378 in the latching mechanism. The upper housing part 252 and the upper part 262 of the ball bearing unit are also shown in FIG. 18.

If an exemplary embodiment comprises an "and/or" conjunction between a first feature and a second feature, this can be read to mean that the exemplary embodiment according to one embodiment contains both the first feature and the second feature, and contains only the first feature or the second feature according to another embodiment.

REFERENCE SYMBOLS 100 vehicle
110 transmission system
120 vehicle transmission
130 selector device
132 selector knob
135 displacement axis or actuation axis
240 slider unit
250 housing unit
252 upper housing part
254 lower housing part
256 base plate
258 fastener
260 ball bearing unit
262 upper part
264 lower part
270 latching mechanism
272 latching connector
274 latching unit
280 sensor device
290 printed circuit board
342 coupling element
344 attachment element
346 fastening element
348 groove
376 latching pin
378 elastic element
382 sensed element
384 retaining element
385 contact
386 other elastic element
466 balls
655 receiving recess
753 oblong hole
755 receiving recess
1053 oblong hole
1057 positioning web
1059 securing element
1192 securing hole
1259 fastening hole

The invention claimed is:

1. A selector device for receiving a user input for shifting a vehicle transmission, the selector device comprising:
   a slider unit coupled to a selector knob;
   a housing unit for receiving the slider unit; and
   a ball bearing unit,
   wherein the slider unit is moveable in a translatory manner in relation to the housing unit,
   wherein the ball bearing unit is configured to guide the slider unit linearly in the housing unit,
   wherein the selector device is configured to be connected to the vehicle transmission for signal transfer,
   wherein the ball bearing unit includes a ball cage for retaining balls,
   wherein the ball cage is configured to receive at least a portion of the slider unit,
   wherein the ball cage has an upper part for retaining balls and a lower part for retaining balls, and
   wherein the slider unit is located between the upper part and the lower part.

2. The selector device according to claim 1, wherein indents are formed in the ball bearing unit for retaining balls.

3. The selector device according to claim 1, wherein the sliding unit includes grooves that form rolling paths for balls in the ball bearing unit.

4. The selector device according to claim 1, further comprising a latching unit attached to the slider unit and by a latching connector attached to the housing unit, wherein the latching unit and the latching connector are configured to interact when the selector device is assembled to hold the slider unit in a resting position in relation to the housing unit.

5. The selector device according to claim 4, wherein the latching unit is held away from the slider unit by an elastic element secured to the slider unit.

6. The selector device according to claim 1, further comprising a sensed element connected to the slider unit, wherein the sensed element is configured to be detected by a detection device to determine a relative position of the slider unit in relation to the housing unit.

7. The selector device according to claim 6, wherein the sensed element is in the shape of a rhombus.

8. The selector device according to claim 6, wherein the sensed element is held away from the slider unit by a second elastic element, and wherein the sensed element is biased toward a printed circuit board in the selector device.

9. The selector device according to claim 6, wherein the sensed element is made of a material that can be detected using a capacitive and/or magnetic detection principle.

10. The selector device according to claim 1, further comprising a printed circuit board that has a detection device for determining a relative position of the slider unit in relation to the housing unit.

11. The selector device according to claim 10, wherein the detection device is configured to determine the relative position using a capacitive and/or magnetic detection principle.

12. The selector device according to claim 1, wherein the housing unit comprises at least two housing parts, wherein the housing parts are secured to one another by fasteners, and wherein at least a portion of the slider unit is placed between the housing parts.

13. A transmission system for a vehicle, comprising:
   the selector device according to claim 1; and
   a vehicle transmission,
   wherein an electrical connection between the selector device and the vehicle transmission allows for signal transfer.

14. A selector device for receiving a user input for shifting a vehicle transmission, the selector device comprising:
- a slider unit coupled to a selector knob;
- a housing for receiving the slider unit; and
- a ball bearing unit,
- wherein a ball cage of the ball bearing unit receives at least a portion of the slider unit,
- wherein the ball bearing unit is configured to guide the slider unit linearly in the housing,
- wherein the ball cage has an upper part for retaining balls and a lower part for retaining balls, and
- wherein the slider unit is located between the upper part and the lower part.

15. The selector device of claim 14, wherein indents are formed in the ball bearing unit for retaining balls.

16. The selector device of claim 14, wherein the sliding unit includes grooves that form rolling paths for balls in the ball bearing unit.

* * * * *